(12) United States Patent
Hashimoto et al.

(10) Patent No.: US 10,625,670 B2
(45) Date of Patent: Apr. 21, 2020

(54) NOTIFICATION DEVICE AND NOTIFICATION METHOD

(71) Applicant: CLARION CO., LTD., Saitama-shi (JP)

(72) Inventors: Takeshi Hashimoto, Motomiya (JP); Kenji Kono, Tokyo (JP); Tetsuo Watanabe, Hasuda (JP); Yasuhiro Fujita, Kashiwa (JP)

(73) Assignee: CLARION CO., LTD., Saitama-Shi (JP)

( * ) Notice: Subject to any disclaimer, the term of this patent is extended or adjusted under 35 U.S.C. 154(b) by 0 days.

(21) Appl. No.: 15/736,748

(22) PCT Filed: Jun. 27, 2016

(86) PCT No.: PCT/JP2016/069019
§ 371 (c)(1),
(2) Date: Dec. 14, 2017

(87) PCT Pub. No.: WO2017/006794
PCT Pub. Date: Jan. 12, 2017

(65) Prior Publication Data
US 2018/0170255 A1    Jun. 21, 2018

(30) Foreign Application Priority Data

Jul. 7, 2015    (JP) ................... 2015-136110

(51) Int. Cl.
*H04R 29/00* (2006.01)
*B60Q 5/00* (2006.01)
(Continued)

(52) U.S. Cl.
CPC .............. *B60Q 5/005* (2013.01); *B60R 11/02* (2013.01); *B60R 11/0217* (2013.01);
(Continued)

(58) Field of Classification Search
CPC ........ B60Q 5/005; B60Q 5/006; B60Q 5/008; B60R 2011/02; B60R 2011/0205;
(Continued)

(56) References Cited

U.S. PATENT DOCUMENTS 4,023,566 A * 5/1977 Martinmaas ........... H04R 5/023
181/199
4,275,363 A * 6/1981 Mishiro ................. B06B 1/0253
310/316.01

(Continued)

FOREIGN PATENT DOCUMENTS

EP        1918892      5/2008
JP     2007-65038     3/2007
(Continued)

OTHER PUBLICATIONS

International Search Report for corresponding International Application No. PCT/JP2016/069019, dated Sep. 13, 2016.
(Continued)

*Primary Examiner* — Leshui Zhang
(74) *Attorney, Agent, or Firm* — Mori & Ward, LLP (57) ABSTRACT

Provided is a notification device and notification method that reduce the output and power consumption of an amplifier or the like and allow a user to sufficiently feel the presence or absence of notification through vibration. A notification device (1) includes a sweep signal generator (4) configured to generate a detection sweep signal by continuously changing the frequency in a frequency band in which a speaker (6) can cause a user to feel a signal in the form of vibration, a vibration detector (7) configured to detect vibration outputted from the speaker (6), and a sound measurement unit (8) configured to detect, as a sweep frequency band, a frequency band in which vibration indicates signal levels equal to or higher than a threshold. The sweep signal generator (4) generates a resonance sweep signal by changing the fre-
(Continued)

quency in the sweep frequency band and causes the speaker (6) to generate vibration.

6 Claims, 6 Drawing Sheets (51) Int. Cl.
*B60R 11/02* (2006.01)
*H04R 9/18* (2006.01)
*H04R 1/02* (2006.01)
*H04R 3/04* (2006.01)
*B60R 11/00* (2006.01)

(52) U.S. Cl.
CPC ............ *H04R 1/025* (2013.01); *H04R 3/04* (2013.01); *H04R 9/18* (2013.01); *H04R 29/001* (2013.01); *B60R 2011/0012* (2013.01); *H04R 2201/023* (2013.01); *H04R 2400/03* (2013.01); *H04R 2499/13* (2013.01)

(58) Field of Classification Search
CPC ..... B60R 2011/0217; B60R 2011/0223; B60R 2011/0241; B60R 2011/0247; B60R 2011/0012; H04R 1/00; H04R 1/025; H04R 3/00; H04R 3/005; H04R 3/02; H04R 3/04; H04R 3/06; H04R 3/08; H04R 3/10; H04R 3/12; H04R 3/14; H04R 29/001; H04R 29/002; H04R 29/003; H04R 29/007; H04R 29/008; H04R 2400/01; H04R 2400/03; H04R 2499/13
USPC ......... 381/56, 57, 58, 59, 95–103, 104, 107, 381/108, 111, 116, 117, 120, 121; 700/94; 340/855.6, 856.3, 856.4
See application file for complete search history.

(56) References Cited

U.S. PATENT DOCUMENTS

| | | | |
|---|---|---|---|
| 5,568,557 A * | 10/1996 | Ross | G10K 11/1788 381/71.11 |
| 6,369,312 B1 * | 4/2002 | Komatsu | G10H 1/00 381/150 |
| 7,165,451 B1 * | 1/2007 | Brooks | A61B 5/0093 601/2 |
| 7,753,163 B2 * | 7/2010 | Bouchard | B06B 3/00 181/148 |
| 2004/0052406 A1 * | 3/2004 | Brooks | G06K 9/00 382/115 |
| 2005/0053252 A1 * | 3/2005 | Cohen | A61H 23/0236 381/333 |
| 2007/0182285 A1 * | 8/2007 | Goodson | B06B 1/0284 310/328 |
| 2009/0074198 A1 * | 3/2009 | Yoshida | G10K 11/178 381/71.4 |
| 2009/0099721 A1 * | 4/2009 | Imai | B60W 50/16 701/46 |
| 2012/0051579 A1 * | 3/2012 | Cohen | A61H 23/0236 381/388 |
| 2012/0113224 A1 * | 5/2012 | Nguyen | G06K 9/0057 348/46 |
| 2016/0150313 A1 * | 5/2016 | Howard | H04R 1/2803 381/71.4 |
| 2016/0255430 A1 * | 9/2016 | Fujita | B60R 11/0217 381/333 |
| 2016/0360330 A1 * | 12/2016 | Fujita | H04R 3/04 |

FOREIGN PATENT DOCUMENTS

| | | | |
|---|---|---|---|
| JP | 2008-72165 | | 3/2008 |
| JP | 2008-129716 | | 6/2008 |
| KR | 20100078991 A | * | 7/2010 |

OTHER PUBLICATIONS

Supplementary European Search Report for corresponding EP Application No. 16821263.7, dated Dec. 17, 2018.
Chinese Office Action for corresponding CN Application No. 201680036025.4, dated Jan. 28, 2019 (w/ machine translation).
Chinese Search Report for corresponding CN Application No. 201680036025.4, dated Jan. 18, 2019.

* cited by examiner

NOTIFICATION DEVICE AND NOTIFICATION METHOD

TECHNICAL FIELD

The present invention relates to a notification device and notification method and, more specifically, to a notification device and notification method that are able to notify the user through vibration.

BACKGROUND ART

There have been known audio systems including speakers installed in vehicle seats (for example, see Patent Literatures 1, 2). Such an audio system is able to output sounds in a low-to-high wide frequency range and includes a full-range speaker installed near the headrest of a seat and subwoofers installed in the backrest of the seat or the seat surface. The subwoofers are embedded in the seat and configured to vibrate the seat in accordance with the signal level of a low-frequency band of music. Thus, when a sound outputted from the full-range speaker installed near the headrest and vibration outputted from the subwoofers are combined together, the realism of music can be enhanced.

Subwoofers are not used solely to enhance the realism of music by outputting deep bass (low-frequency sounds). They have been also recently used as means for notifying the driver.

For example, a vehicle notification device has been proposed that when the vehicle departs from the lane, notifies the driver of the departure of the vehicle through vibration. A vehicle notification device has been also proposed that notifies the driver of the position of a lane marking that the vehicle has crossed, through the vibration occurrence position (for example, see Patent Literature 3). As seen above, these vehicle notification devices are able to notify the driver of an alarm about the departure from the lane and whether the vehicle has crossed the left lane marking or crossed the right lane marking, by vibrating the vibrators (subwoofers, etc.) installed in left-right positions of the driver's seat as necessary.

There have been also proposed many other methods of notifying the driver by vibrating speakers or the like installed in the driver's seat.

CITATION LIST

Patent Literature

PTL 1: Japanese Unexamined Patent Application Publication No. 2007-65038
PTL 2: Japanese Unexamined Patent Application Publication No. 2008-72165
PTL 3: Japanese Unexamined Patent Application Publication No. 2008-129716

SUMMARY OF INVENTION

Technical Problem

Typical examples of speakers embedded in the seat include dynamic speakers using cone paper or the like and exciters that output a sound or vibration by vibrating the contact surface. No matter what type of speaker is embedded in the seat, the vibration component of a low-frequency sound or low-frequency vibration tends to significantly decrease on the seat surface. For this reason, a notification device including speakers embedded in the seat needs to output a high-level sound signal so that the user can reliably feel vibration. Outputting a high-level sound signal requires a power amplifier having a high amplification factor and capable of outputting a high-power sound, posing a problem of increasing power consumption. Outputting such a signal also poses a problem of increasing the cost of the notification device.

The present invention has been made in view of the foregoing, and an object thereof is to provide a notification device and notification method that when outputting vibration from speakers installed in a seat, are able to generate large vibration even if the vibration has low signal levels and to reduce the output and power consumption of an amplifier or the like.

Solution to Problem

A notification device according to one aspect of the present invention includes a speaker installed in a seat, a sweep signal generator configured to generate a detection sweep signal capable of continuously changing a frequency of vibration that the speaker causes a user to feel, by changing a frequency of a predetermined wave at a constant speed in a frequency band in which the user can be caused to feel a signal in the form of the vibration, a vibration detector configured to detect vibration outputted from the speaker using the detection sweep signal generated by the sweep signal generator, and a sound measurement unit configured to detect a frequency band indicating a signal level equal to or higher than a predetermined threshold as a sweep frequency band in frequency characteristics of the vibration detected by the vibration detector. The sweep signal generator generates a resonance sweep signal by changing the frequency of the predetermined wave at a constant speed in the sweep frequency band detected by the sound measurement unit, and the speaker generates vibration in the seat using the resonance sweep signal.

A notification method using a notification device according to another aspect of the present invention includes a detection sweep signal generation step of generating, by a sweep signal generator, a detection sweep signal capable of continuously changing a frequency of vibration that a speaker installed in a seat causes a user to feel, by changing a frequency of a predetermined wave at a constant speed in a frequency band in which the user can be caused to feel a signal in the form of the vibration, a vibration detection step of detecting, by a vibration detector, vibration outputted from the speaker using the detection sweep signal generated in the detection sweep signal generation step, a sound measurement step of detecting, by a sound measurement unit, a frequency band indicating a signal level equal to or higher than a predetermined threshold as a sweep frequency band in frequency characteristics of the vibration detected in the vibration detection step, and a resonance sweep signal generation step of generating, by the sweep signal generator, a resonance sweep signal by changing the frequency of the predetermined wave at a constant speed in the sweep frequency band detected by the sound measurement unit. The speaker generates vibration in the seat using the resonance sweep signal.

A speaker embedded in a typical seat causes resonance by outputting a signal having a particular frequency. The frequency at which resonance occurs is called the "resonant frequency." The resonant frequency depends on the natural frequency specific to the member of the seat or the like. For this reason, even if the speaker outputs a low-level signal, it can generate relatively large vibration.

The notification device and notification method obtain frequency characteristics of vibration by causing the speaker to output a detection sweep signal and then detect, as a sweep frequency band, a frequency band indicating signal levels equal to or higher than the threshold in the obtained frequency characteristics. The sweep frequency band incorporates the frequency at which resonance occurs (the resonant frequency), by changing the frequency of the predetermined wave.

The notification device and notification method then generate a resonance sweep signal by changing the frequency of the predetermined wave at the constant speed in the sweep frequency band including the resonant frequency and cause the speaker to output the resonance sweep signal so that vibration occurs in the seat. Thus, resonant vibration can be generated in the seat, and the user sitting on the seat can be caused to feel the larger vibration. Also, the notification device and notification method generate a resonance sweep signal so that resonant vibration occurs and then cause the speaker to generate vibration. Thus, it is possible to reduce the output and power consumption of an amplifier or the like. Note that an exciter is preferably used as the speaker. An exciter is able to transmit a vibration force transmitted from a voice coil to an object and to cause the object to output vibration or sound as a diaphragm.

In the notification device, the sweep signal generator may change a cycle of vibration generated by the speaker by changing a speed at which the frequency of the predetermined wave of the resonance sweep signal is changed.

In the notification method using the notification device, the sweep signal generation step may include the sweep signal generator changing a cycle of vibration generated by the speaker by changing a speed at which the frequency of the predetermined wave of the resonance sweep signal is changed.

In the notification device and notification method, the moving time (sweep time) of the predetermined wave of the resonance sweep signal is changed by changing the speed at which the frequency of the predetermined wave of the resonance sweep signal is changed. By changing the sweep time, the cycle of vibration generated by the speaker can be changed. Thus, for example, the vibration cycle can be changed in accordance with the notification purpose to generate a different pattern of vibration, and the user can be caused to feel the different pattern of vibration. For example, the degrees of urgency may be previously set on the basis of the notification content, and the speed at which the frequency of the predetermined wave is changed (the sweep time) may be changed so that the vibration cycle is shortened as the degree of urgency is increased.

In the notification device, the sweep signal generator may change a state of vibration generated by the speaker by setting at least one of an upper-limit frequency and a lower-limit frequency of the resonance sweep signal obtained by changing the frequency of the predetermined wave, to a frequency different from an upper-limit frequency and a lower-limit frequency of the sweep frequency band detected by the sound measurement unit.

In the notification method using the notification device, the resonance sweep signal generation step may include the sweep signal generator changing a state of vibration generated by the speaker by setting at least one of an upper-limit frequency and a lower-limit frequency of the resonance sweep signal obtained by changing the frequency of the predetermined wave, to a frequency different from an upper-limit frequency and a lower-limit frequency of the sweep frequency band detected in the sound measurement step.

In the notification device and notification method, at least one of the upper-limit frequency and the lower-limit frequency of the resonance sweep signal obtained by changing the frequency of the predetermined wave is set to a frequency different from the upper-limit frequency and the lower-limit frequency of the sweep frequency band. The sweep frequency band is a frequency band indicating signal levels equal to or higher than the threshold in the frequency characteristics of vibration. Accordingly, the sweep frequency band includes the resonant frequency. However, the resonant frequency tends to vary due, for example, to the individual differences between speakers (exciters) that generate vibration, variations in seat materials that transmit vibration, the installation position of the speaker (exciter) or the like in the seat, or the aged deterioration of the seat or speaker (exciter). For this reason, by setting the upper-limit frequency and/or lower-limit frequency of the resonance sweep signal to a frequency different from the sweep frequency band, the resonant frequency can be adjusted so that the resonant frequency falls within the frequency range of the resonance sweep signal even if the resonant frequency varies due to aged deterioration or the like.

In the notification device, the sound measurement unit may detect, as a resonant frequency, a frequency value indicating a high signal level in the frequency characteristics of the vibration detected by the vibration detector, and the sweep signal generator may change, to the resonant frequency, at least one of the upper-limit frequency and the lower-limit frequency of the resonance sweep signal obtained by changing the frequency of the predetermined wave.

In the notification method using the notification device, the sound measurement step may include the sound measurement unit detecting, as a resonant frequency, a frequency value indicating a high signal level in the frequency characteristics of the vibration detected in the vibration detection step, and the resonance sweep signal generation step may include the sweep signal generator changing, to the resonant frequency, at least one of the upper-limit frequency and the lower-limit frequency of the resonance sweep signal obtained by changing the frequency of the predetermined wave.

In the notification device and notification method, at least one of the upper-limit frequency and the lower-limit frequency of the resonance sweep signal obtained by changing the frequency of the predetermined wave may be set to the resonant frequency. The resonance sweep signal typically increases vibration at the resonant frequency. While the frequency of the predetermined wave of the resonance sweep signal is changed from the lower-limit frequency to the resonant frequency, the intensity of vibration is gradually amplified. Also, while the frequency of the predetermined wave of the resonance sweep signal is changed from the resonant frequency to the upper-limit frequency, the intensity of vibration is gradually reduced. Accordingly, if the upper-limit frequency of the frequency range in which the frequency of the predetermined wave of the resonance sweep signal is changed is changed to the resonant frequency, the intensity of vibration generated by the speaker can be gradually amplified. Also, if the lower-limit frequency of the frequency range in which the frequency of the predetermined wave of the resonance sweep signal is changed is changed to the resonant frequency, the intensity of vibration generated by the speaker can be gradually reduced.

Advantageous Effects of Invention

The notification device and notification method of an embodiment of the present invention obtain frequency characteristics of vibration by causing the speaker to output a detection sweep signal and then detect, as a sweep frequency band, a frequency band indicating signal levels equal to or higher than the threshold in the obtained frequency characteristics. The sweep frequency band incorporates the frequency at which resonance occurs (the resonant frequency), by changing the frequency of the predetermined wave.

Accordingly, the notification device and notification method then generate a resonance sweep signal by changing the frequency of the predetermined wave at the constant speed in the sweep frequency band including the resonant frequency and cause the speaker to output the resonance sweep signal so that vibration occurs in the seat. Thus, resonant vibration can be generated in the seat, and the user sitting on the seat can be caused to feel the larger vibration. Also, the notification device and notification method generate a resonance sweep signal so that resonant vibration occurs and then cause the speaker to generate vibration. Thus, it is possible to reduce the output and power consumption of an amplifier or the like.

DESCRIPTION OF EMBODIMENTS

Figure 1:
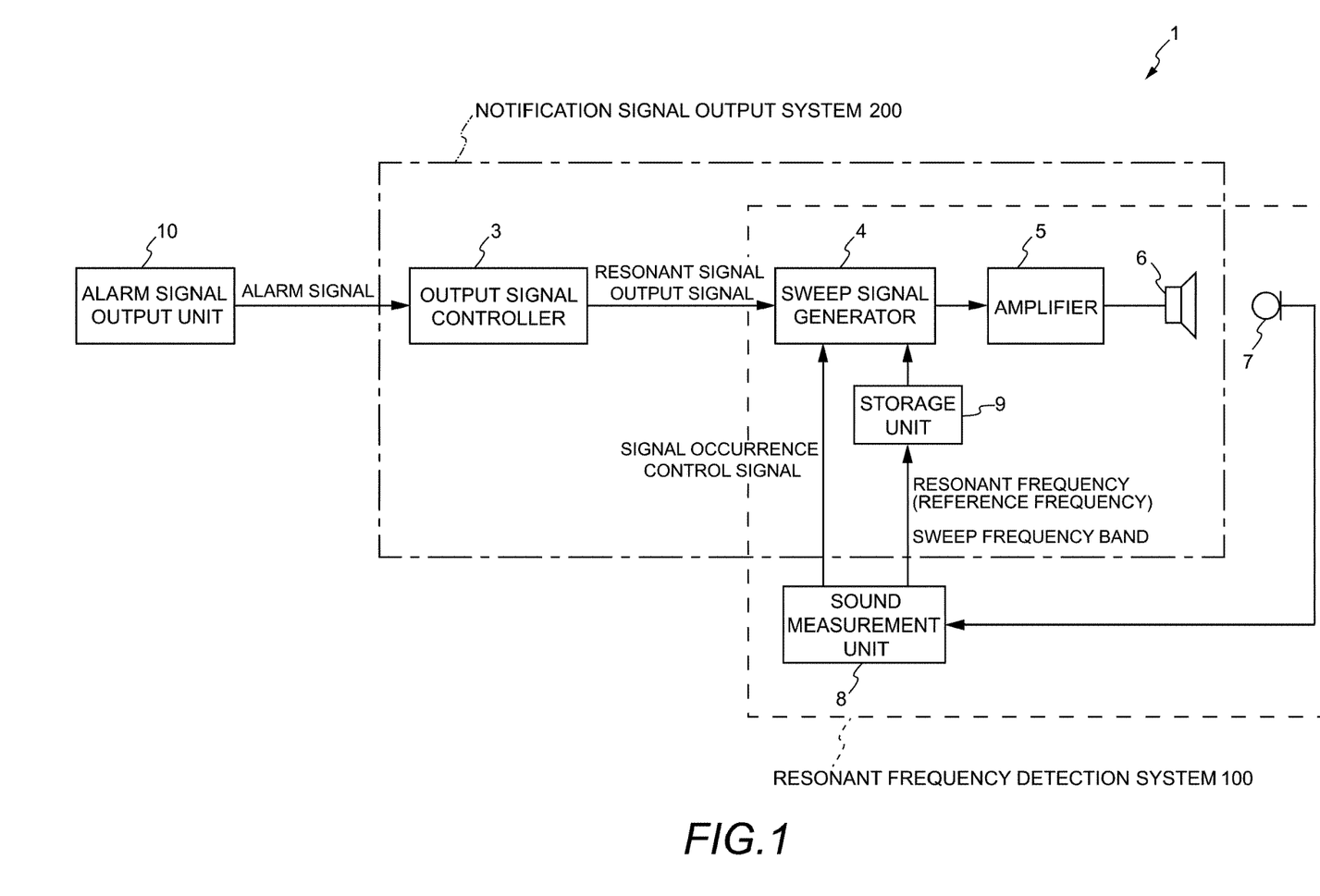
FIG. 1 is a block diagram showing a schematic configuration of a vehicle alarm device according to an embodiment.

Now, a vehicle alarm device serving as one example of a notification device according to the present invention will be described in detail with reference to the drawings. FIG. 1 is a block diagram showing a schematic configuration of a vehicle alarm device 1. The vehicle alarm device 1 (notification device) includes an output signal controller 3, a sweep signal generator 4, an amplifier 5, an exciter (speaker) 6, a microphone (vibration detector) 7, a sound measurement unit 8, and a storage unit 9. The output signal controller 3 receives an alarm-related signal (alarm signal) from an alarm signal output unit 10.

As shown in FIG. 1, the vehicle alarm device 1 are able to broadly serve as two systems. Specifically, first, the vehicle alarm device 1 serves as a resonant frequency detection system 100 that detects a frequency band in which resonance occurs in the environment in which the exciter 6 is installed. Secondly, it serves as a notification signal output system 200 that outputs, from the exciter 6, a sweep signal obtained by changing the frequency of a predetermined wave in the frequency band detected by the resonant frequency detection system 100.

In order for the notification signal output system 200 to output a notification sound from the exciter 6 using resonance, the resonant frequency detection system 100 needs to obtain a frequency at which effective resonance can occur (the frequency at which resonance occurs will be referred to as the resonant frequency). Accordingly, in the present embodiment, first, there will be described a process of detecting a predetermined frequency band (frequency range) including the resonant frequency using the resonant frequency detection system 100. Next, there will be described a process of outputting a notification signal using the notification signal output system 200.

Resonant Frequency Detection Process by Resonant Frequency Detection System

The resonant frequency detection system 100 roughly includes the sweep signal generator 4, the amplifier 5, the exciter 6, the microphone 7, the sound measurement unit 8, and the storage unit 9.

The exciter 6 is installed in a position which is within a seat of a vehicle and which allows vibration to be transmitted to a person (driver) sitting on the seat. An exciter refers to a sound output device that is able to transmit a vibration force transmitted from a voice coil to an object in contact with the exciter and to cause the object to output vibration or sound as a diaphragm. The driver can be notified by causing the exciter 6 installed in the vehicle seat to generate vibration as necessary and causing the driver sitting on the seat to feel the vibration. The exciter 6 receives a sweep signal amplified by the amplifier 5.

While, in the present embodiment, the exciter is described as an example of a speaker capable of outputting vibration, a speaker of a type other than an exciter may be used. Any type of speaker or a speaker having any configuration may be used as long as the speaker is able to cause the user to feel a sweep signal as vibration.

The sweep signal generator 4 generates a sweep signal by continuously changing (sweeping) the frequency of a sinusoidal wave at a constant speed in a predetermined frequency range. Specifically, the sweep signal generator 4 generates a sweep signal for measuring a resonant frequency in the environment in which the exciter 6 is installed (hereafter referred to as a "detection sweep signal"), on the basis of a signal occurrence control signal received from the sound measurement unit 8. The sweep signal generator 4 uses a frequency range of 0 Hz to 375 Hz as the predetermined frequency range in generating a detection sweep signal. The frequency range is not limited to any particular frequency value or range as long as it allows the exciter 6 to generate a signal in the form of vibration.

The sweep signal generator 4 also generates a sweep signal for causing the exciter 6 to generate vibration that causes resonance (hereafter referred to as a "resonance sweep signal"), on the basis of a resonant signal output signal received from the output signal controller 3. There will be described later the frequency range in which the sweep signal generator 4 continuously changes the frequency of a sinusoidal wave in generating a resonance sweep signal, the speed at which and the time (sweep time) during which the sinusoidal wave varies in the set frequency range, and the like.

While, in the present embodiment, the frequency of the "sinusoidal wave" is continuously changed in generating a sweep signal (detection sweep signal, resonance sweep signal), the wave (predetermined wave) to be swept is not limited to the "sinusoidal wave" and may be a wave showing any other waveform. Upon receipt of a signal occurrence control signal from the sound measurement unit 8, the sweep signal generator 4 generates a detection sweep signal and outputs it to the amplifier 5. Also, upon receipt of a resonant signal output signal from the output signal controller 3, the sweep signal generator 4 generates a resonance sweep signal and outputs it to the amplifier 5.

The amplifier 5 amplifies the sweep signal (detection sweep signal, resonance sweep signal) received from the sweep signal generator 4 and outputs the amplified sweep signal to the exciter 6. The exciter 6 installed in the seat outputs the received sweep signal onto the seat surface in the form of vibration.

The microphone 7 detects the vibration on the seat surface. The microphone 7 serves as a vibration detector. Since the vibration wave outputted onto the seat surface from the exciter 6 can be detected as a sound, the microphone 7 detects the vibration by collecting the vibration as a sound. Note that a vibration sensor that directly detects vibration may be used in place of the microphone 7. The microphone 7 outputs information about the detected vibration to the sound measurement unit 8.

The sound measurement unit 8 outputs a signal occurrence control signal to the sweep signal generator 4. The sound measurement unit 8 also detects a resonant frequency on the basis of the information about the vibration detected by the microphone 7. The sound measurement unit 8 also sets a parameter of a resonance sweep signal.

The sound measurement unit 8 outputs a signal occurrence control signal to the sweep signal generator 4 so that the sweep signal generator 4 outputs a detection sweep signal. As described above, the sweep signal generator 4 generates a detection sweep signal on the basis of the signal occurrence control signal received from the sound measurement unit 8 and outputs it to the amplifier 5.

Figure 2:
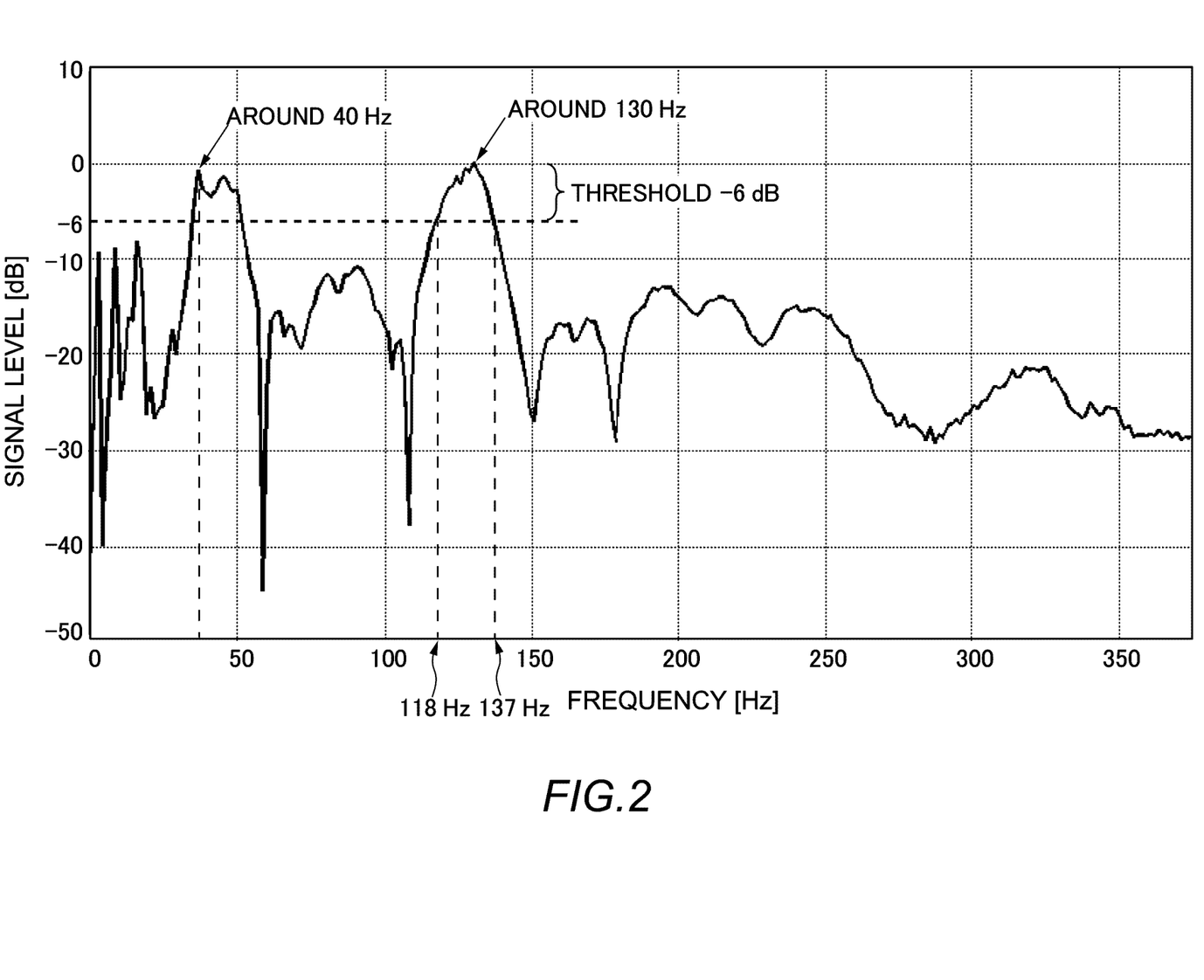
FIG. 2 is a diagram showing frequency characteristics of vibration outputted from an exciter on the basis of a detection sweep signal according to the embodiment.

The sound measurement unit 8 also detects a resonant frequency and determines the frequency range of a resonance sweep signal on the basis of sound characteristics of the vibration detected by the microphone 7. FIG. 2 shows an example of the frequency characteristics (sound characteristics) of the vibration detected by the microphone 7. The sound characteristics shown in FIG. 2 are obtained by changing the frequency of a sinusoidal wave in the sweep range of a sweep signal of 0 Hz to 375 Hz, as described above. The sound characteristics shown in FIG. 2 indicate high signal level values around 40 Hz and 130 Hz.

These high-signal-level frequencies (around 40 Hz and 130 Hz) correspond to frequencies at which the vibration outputted from the exciter 6 installed in the seat resonates due to the structure of the seat, or the like (i.e., resonant frequencies). The frequencies at which resonance occurs (the resonant frequencies) are determined or changed due, for example, to the individual differences between exciters or speakers that generate vibration, variations in seat materials that transmit vibration, the installation position of the exciter or the like in the seat, or the aged deterioration of the seat, exciter, or the like. For this reason, to reliably detect resonant frequencies, the sweep signal generator 4 sets the frequency range in which resonance can occur, to a sweep range (a range of 0 Hz to 375 Hz in the present embodiment), then generates a detection sweep signal, and causes the exciter 6 to output the detection sweep signal.

The sound measurement unit 8 sets the reference frequency for determining the frequency range of a resonance sweep signal, to 130 Hz, which indicates the highest signal level among frequencies around 40 Hz and those near 130 Hz indicating higher signal levels. Note that the reference frequency is not necessarily determined only because of indicating the highest signal level. The operating environment of the vehicle alarm device 1 using the resonant frequencies, and the like are also considered in determining the reference frequency. For example, in the case of the vehicle alarm device 1 according to the present embodiment, vibration from the road surface may be transmitted to the seat while the vehicle travels. For this reason, the reference frequency serving as a reference of the frequency range of a resonance sweep signal preferably differs from the frequency of the vibration from the road surface. Accordingly, the vehicle alarm device 1 determines, as the reference frequency, a frequency value which is within a frequency band of 150 Hz or less and indicates the highest possible signal level. This is because if a frequency indicating a low signal level is determined as the reference frequency, it is difficult to distinguish such a frequency from the frequency of the vibration from the road surface. The sound measurement unit 8 determines the reference frequency as a resonant frequency and outputs it to the storage unit 9. The storage unit 9 stores the resonant frequency.

The sound measurement unit 8 then regards the signal level of the reference frequency (the resonant frequency of 130 Hz) as a reference and sets the threshold to −6 dB from the signal level of the reference frequency (the resonant frequency of 130 Hz). The sound measurement unit 8 also detects a lower-limit frequency and an upper-limit frequency corresponding to the threshold of −6 dB. In the sound characteristics shown in FIG. 2, the sound measurement unit 8 detects 118 Hz as the lower-limit frequency and 137 Hz as the upper-limit frequency.

Note that the threshold is set to −6 dB as an example, but is not limited thereto. If the threshold is set to a large value, it is possible to increase changes in the intensity of vibration that occurs with a sweep of a resonance sweep signal. However, if the threshold is set to a large value, the interval between the lower-limit frequency and upper-limit frequency would be widened. For this reason, the threshold may be determined considering the interval between the lower-limit frequency and upper-limit frequency, or the like. The frequency band from the lower-limit frequency to the upper-limit frequency detected by the sound measurement unit 8 is outputted to the storage unit 9 as a sweep frequency band and stored therein.

The storage unit 9 stores the lower-limit frequency and upper-limit frequency detected by the sound measurement unit 8 on the basis of the threshold and the resonant frequency (reference frequency) set by the sound measurement unit 8. The lower-limit frequency, the upper-limit frequency, and the resonant frequency stored in the storage unit 9 are used to determine the frequency range of a resonance sweep signal generated by the sweep signal generator 4. Note that the storage unit 9 may have any configuration as long as it can store the lower-limit frequency, the upper-limit frequency, and the resonant frequency. A typical hard disk, solid-state drive (SSD), nonvolatile memory, or the like may be used as the storage unit 9. The storage unit 9 may also be formed as an internal memory of the sweep signal generator 4 rather than as a function unit different from the sweep signal generator 4.

Notification Signal Output Process by Notification Signal Output System

The notification signal output system 200 roughly includes the output signal controller 3, the sweep signal generator 4, the amplifier 5, the exciter 6, and the storage unit 9.

The output signal controller 3 controls the output of a resonance sweep signal by the sweep signal generator 4 on the basis of an alarm signal received from the alarm signal output unit 10. The alarm signal output unit 10 refers to a device that outputs alarm signals such as a lane departure signal, a vehicle approach signal, a doze detection signal, and a sharp curve signal. A lane departure signal refers to an alarm signal that is outputted when the vehicle departs from the lane; a vehicle approach signal refers to an alarm signal that is outputted when an obstacle (a traveling vehicle, etc.) approaches the vehicle in front or rear; a doze detection signal refers to an alarm signal that is outputted when a doze of the driver is detected by detecting the angle of the face of the driver or the time interval between blinks of the driver or detecting the fluctuation of the center position of the steering; and a sharp curve signal refers to an alarm signal that is outputted when it is detected that a sharp curve lies in front of the vehicle. These alarming matters are detected using a typical method such as a method of capturing images of the front of the vehicle and analyzing the images or a method of detecting an alarming matter by radiating a radar wave forward and measuring a reflected wave.

When the output signal controller 3 receives an alarm signal from the alarm signal output unit 10, it determines the degree of urgency on the basis of the content of the alarm signal. The degree of urgency corresponds to the degree of importance of an alarm signal transmitted to the driver. For example, if the output signal controller 3 receives a sharp curve signal as the content of an alarm signal, it determines that the degree of urgency is 1; if it receives a doze detection signal, it determines that the degree of urgency is 2; if it receives a lane departure signal, it determines that the degree of urgency is 3; and if it receives a vehicle approach signal, it determines the degree of urgency is 4. The output signal controller 3 then outputs a resonant signal output signal including information about the degree of urgency to the sweep signal generator 4.

When the sweep signal generator 4 receives the resonant signal output signal from the output signal controller 3, it reads the lower-limit and upper-limit frequency values stored in the storage unit 9. The frequency range obtained from the lower-limit frequency (118 Hz) and the upper-limit frequency (137 Hz) is a frequency range including the frequency at which vibration causes resonance in the seat having the exciter 6 installed therein (the resonant frequency: 130 Hz).

The sweep signal generator 4 then determines the frequency range (parameter) of a resonance sweep signal on the basis of the lower-limit frequency of 118 Hz and the upper-limit frequency of 137 Hz read from the storage unit 9. As described above, the resonant frequency is determined or changed on the basis of, for example, the individual differences between exciters or speakers that generate vibration, variations in seat materials that transmit vibration, the installation position of the exciter or the like in the seat, or the aged deterioration of the seat, exciter, or the like. Accordingly, the frequency at which resonance occurs (the resonant frequency) may vary in accordance with the installation situation of the seat, exciter, or the like, or due to the aged deterioration. For this reason, the sweep signal generator 4 determines the frequency range (parameter) of a resonance sweep signal by setting a variation margin considering the variation in the resonant frequency.

The sweep signal generator 4 according to the present embodiment sets a variation margin of 3 Hz. The sweep signal generator 4 then sets the lower-limit value of the frequency range of a resonance sweep signal to 115 Hz, which is obtained by considering 3 Hz with respect to the lower-limit frequency of 118 Hz read from the storage unit 9, and also sets the upper-limit value of the frequency range of a resonance sweep signal to 140 Hz, which is obtained by considering 3 Hz with respect to the upper-limit frequency of 137 Hz. The sweep signal generator 4 then obtains the degree of urgency from the resonant signal output signal and determines the sweep time in accordance with the degree of urgency obtained.

As used herein, the term "sweep time" refers to a time for changing the frequency of a sinusoidal wave from the lower-limit frequency to the upper-limit frequency at a constant speed. In the present embodiment, the lower-limit frequency is set to 115 Hz, and the upper-limit frequency is set to 140 Hz. Also, the sweep signal generator 4 according to the present embodiment sets the sweep time to 1 second. The sweep signal generator 4 then generates a resonance sweep signal by changing the frequency of a sinusoidal wave in a frequency range of 115 Hz to 140 Hz at the constant speed for the sweep time of 1 second.

Figure 3A:
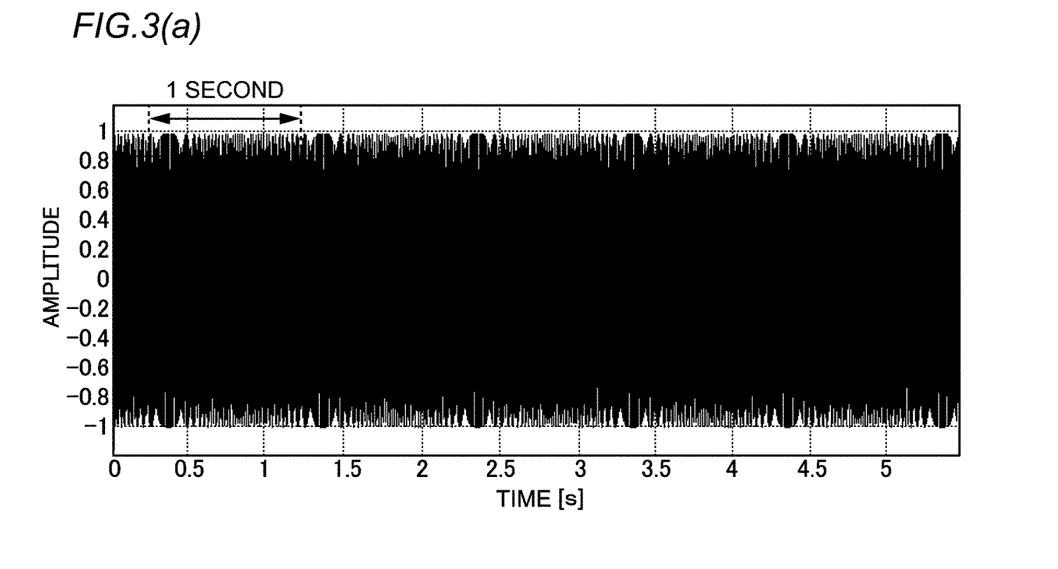
FIG. 3(a) is a diagram showing amplitude characteristics of a resonance sweep signal generated by a sweep signal generator according to the embodiment.
Figure 3B:
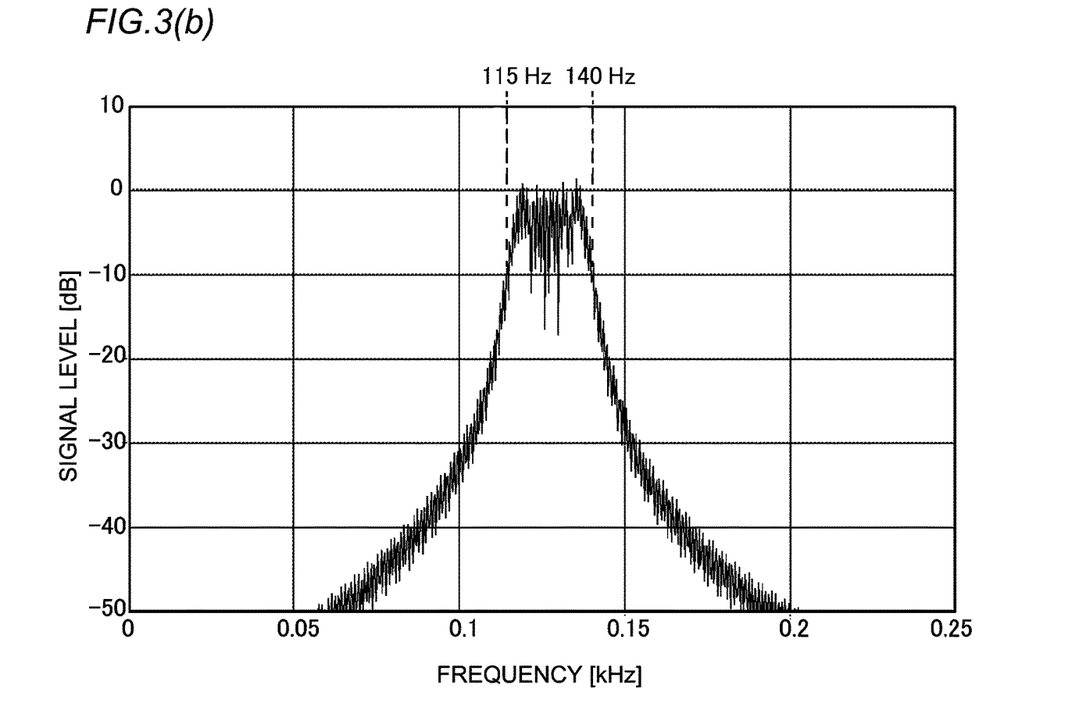
FIG. 3(b) is a diagram showing frequency characteristics thereof.

FIG. 3(*a*) is a diagram showing amplitude characteristics of the resonance sweep signal generated by the sweep signal generator 4. FIG. 3(*a*) shows a state in which a resonance sweep signal having a sweep time of 1 second has been continuously outputted. FIG. 3(*b*) is a diagram showing frequency characteristics of the resonance sweep signal generated by the sweep signal generator 4. FIG. 3(*b*) indicates that high signal levels have been detected in the frequency range of 115 Hz to 140 Hz, which is the sweep range of the resonance sweep signal. The resonance sweep signal thus generated is outputted to the amplifier 5.

The amplifier 5 amplifies the resonance sweep signal received from the sweep signal generator 4 and then outputs the amplified signal to the exciter 6. The exciter 6 outputs the resonance sweep signal amplified by the amplifier 5. Thus, the exciter 6 installed in the seat is able to output vibration that causes resonance. The use of resonance in this manner allows the signal level to be increased with the signal level of the resonant frequency of 130 Hz being the highest, even if the resonance sweep signal has a low output level. Thus, even if the exciter 6 generates vibration using a low-level resonance sweep signal, it is able to generate relatively large vibration and thus to notify the driver sitting on the seat through the vibration.

Figure 4A:
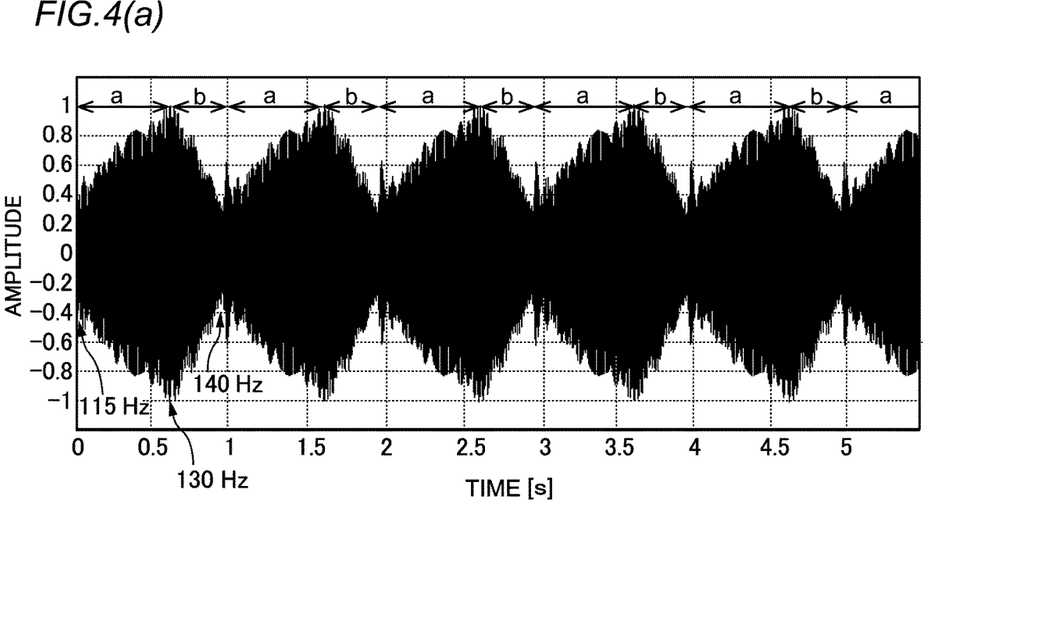
FIG. 4(a) is a diagram showing amplitude characteristics of vibration outputted from the exciter on the basis of a resonance sweep signal.
Figure 4B:
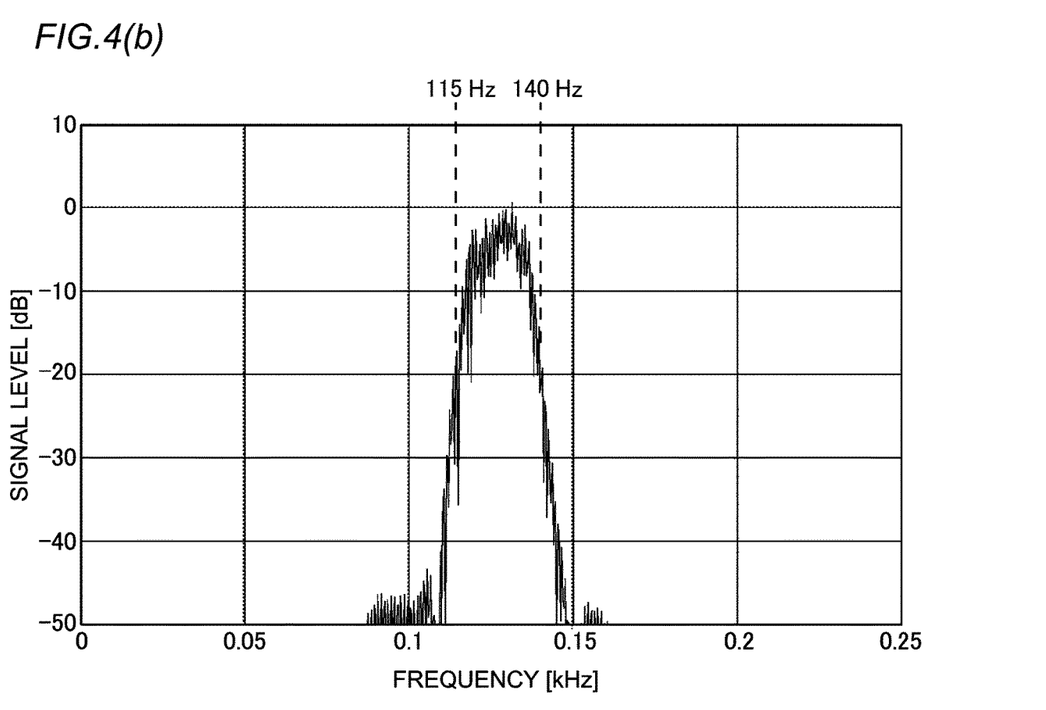
FIG. 4(b) is a diagram showing frequency characteristics thereof.

FIG. 4(*a*) shows amplitude characteristics of the resonance sweep signal outputted from the exciter 6 and measured by the microphone 7, and FIG. 4(*b*) shows frequency characteristics thereof. The sinusoidal wave sweeps the frequency range of 115 Hz to 140 Hz while crossing (passing through) 130 Hz serving as a resonant frequency. For this reason, as shown in FIG. 4(*a*), the amplitude value varies so as to correspond to the sweep state of the sinusoidal wave. The cycle in which the amplitude value varies is the sweep time (1 second), and the amplitude value repeatedly varies in a similar manner in cycles of 1 second.

As shown in FIG. 4(*b*), the frequency characteristics are weighted (the signal level is increased) in accordance with the sound characteristics (115 Hz to 140 Hz). The frequency characteristics shown in FIG. 4(b) correspond to changes in the signal level in the frequency range of 115 Hz to 140 Hz in the frequency characteristics shown in FIG. 2.

When the exciter 6 generates vibration using the resonance sweep signal, the amplitude value is gradually increased in a section "a" from 115 Hz, which is the frequency at which the sinusoidal wave starts to sweep, to 130 Hz, which is the resonant frequency, as shown in FIG. 4(a). Thus, the intensity of the vibration felt by the driver can be gradually increased. Also, the amplitude value is gradually reduced in a section "b" from 130 Hz, which is the resonant frequency, to 140 Hz, which is the frequency at which the sinusoidal wave ends the sweep. Thus, the intensity of the vibration felt by the driver can be gradually reduced, and the attenuation of the vibration can be felt by the driver.

Figure 5A:
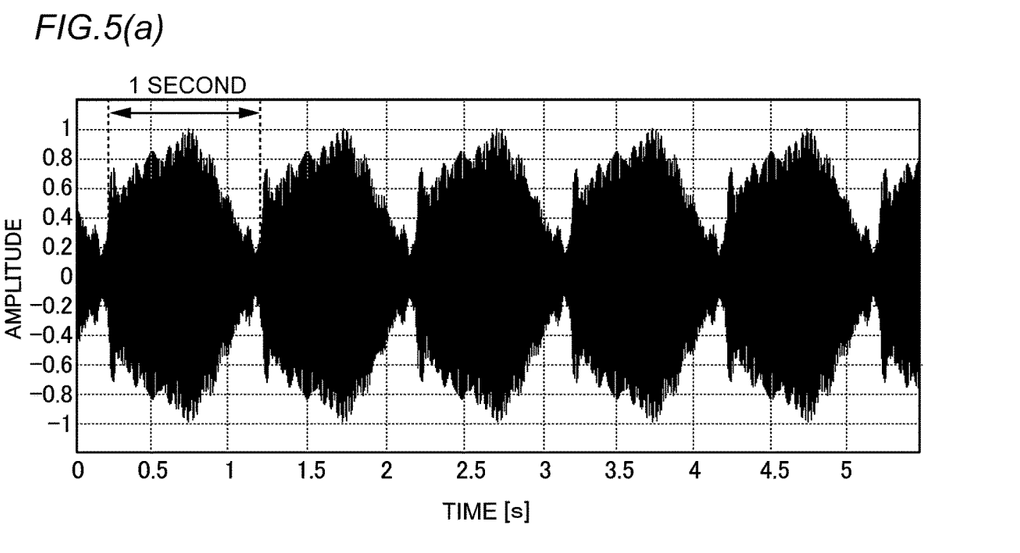
FIG. 5(a) is a diagram showing amplitude characteristics when the frequency range of the resonance sweep signal shown in FIG. 4(a) is shifted by 3 Hz.

FIG. 5(a) shows amplitude characteristics when another variation margin of 3 Hz is set for the frequency range of the resonance sweep signal shown in FIG. 4(a) and thus the frequency range to be swept is shifted to a frequency range of 118 Hz to 143 Hz by 3 Hz. A comparison between FIG. 5(a) and FIG. 4(a) indicates that the maximum amplitude value or cycle does not vary at all, since both sinusoidal waves sweep the resonant frequency of 130 Hz. Thus, it is appreciated that even if the resonant frequency value of 130 Hz varies due to aged deterioration or the like, the maximum level of vibration generated by the resonance sweep signal does not vary. As a result, even if aged deterioration or the like occurs, resonant vibration can be sufficiently felt by the driver.

Figure 5B:
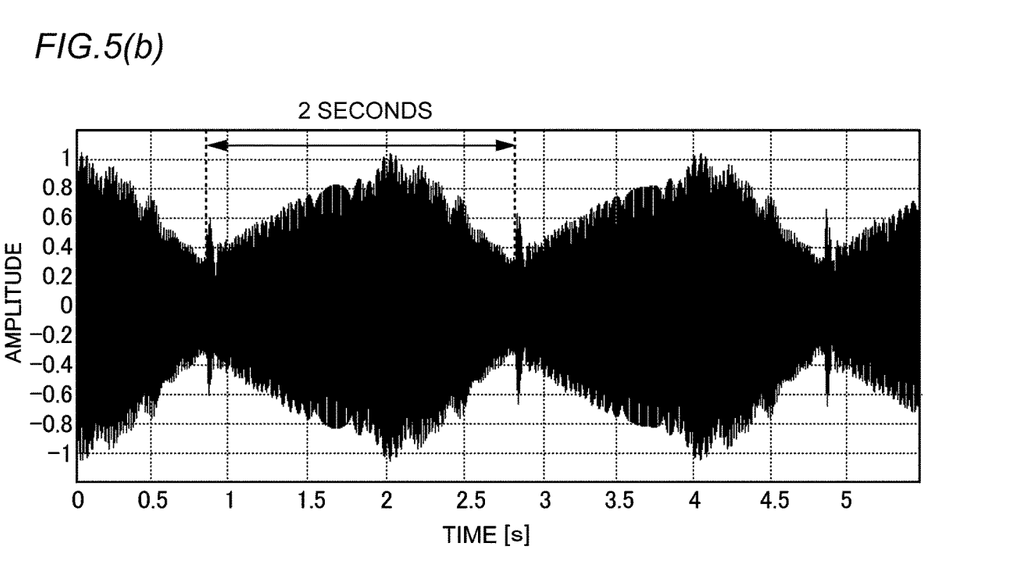
FIG. 5(b) is a diagram showing amplitude characteristics when the sweep time of the resonance sweep signal shown in FIG. 4(a) is set to 2 seconds.

FIG. 5(b) shows amplitude characteristics when the sweep time in the frequency range of the resonance sweep signal shown in FIG. 4(a) is set to 2 seconds. By setting the sweep time to 2 seconds, the time during which the frequency of the sinusoidal wave is changed in a frequency range of 115 Hz to 140 Hz at a constant speed becomes 2 seconds. As shown in FIG. 5(b), the sweep time corresponds to the cycle of the resonant vibration. Accordingly, by changing the sweep time, the cycle in which the vibration varies can be changed.

The output signal controller 3 determines the degree of urgency in accordance with the content of an alarm signal received from the alarm signal output unit 10 and outputs a resonant signal output signal including the degree of urgency to the sweep signal generator 4. The sweep signal generator 4 determines the sweep time on the basis of the degree of urgency included in the resonant signal output signal and generates a resonance sweep signal. As seen above, the sweep signal generator 4 is able to change the cycle of vibration by changing the sweep time on the basis of the degree of urgency and thus to cause the driver to feel different types of vibration.

Figure 6A:
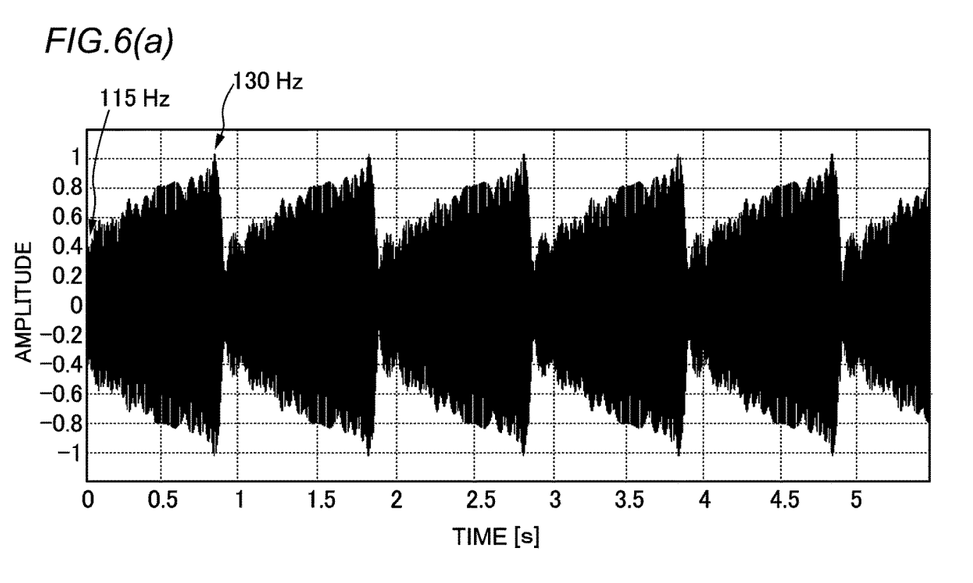
FIG. 6(a) is a diagram showing amplitude characteristics when the lower-limit frequency of the resonance sweep signal according to the embodiment is set to 115 Hz and the upper-limit frequency thereof is set to 130 Hz.
Figure 6B:
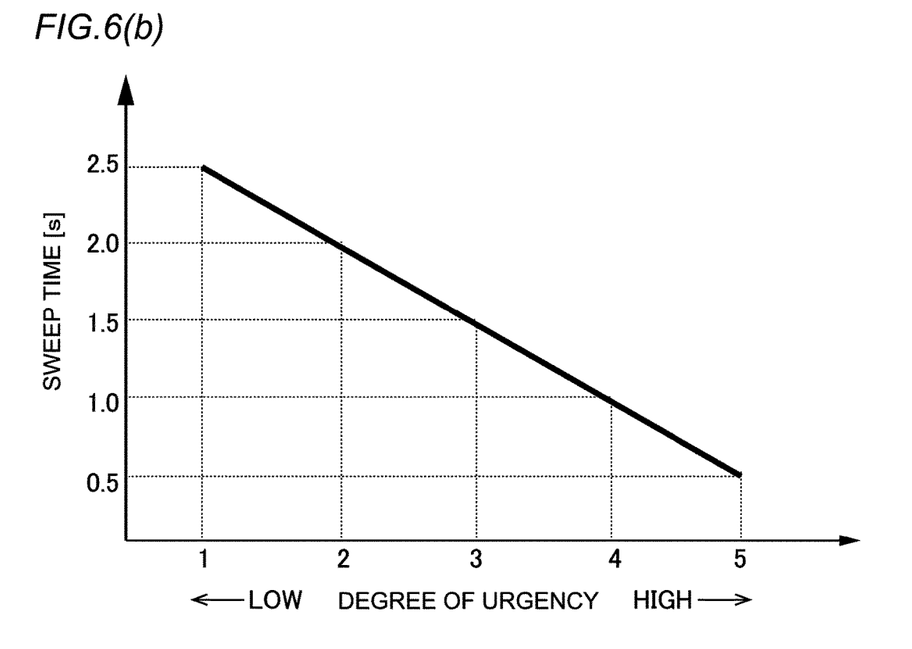
FIG. 6(b) is a diagram showing the relationship between the degree of urgency of an alarm signal and the sweep time of the resonance sweep signal.

For example, FIG. 6(b) is a diagram showing the relationship between the degree of urgency and the sweep time when the sweep time is changed in accordance with the degree of urgency of an alarm signal. As shown in FIG. 6(b), if the degree of urgency is high, the sweep time is reduced. Thus, the intensity of vibration varies in short cycles. On the other hand, if the degree of urgency is low, the sweep time is increased. Thus, the intensity of vibration repeatedly varies slowly in long cycles. If the vibration cycles are short, the driver would frequently feel changes in the intensity of the vibration and thus could intuitively recognize that the degree of urgency is high. On the other hand, if the vibration cycles are long, the driver would feel slowly repeated changes in the vibration and thus could intuitively recognize that the degree of urgency is low.

As described above, FIG. 6(a) shows amplitude characteristics when the lower-limit frequency of the frequency range of the resonance sweep signal is set to 115 Hz and the upper-limit frequency thereof is set to 130 Hz, and the upper-limit frequency of 130 Hz is the resonant frequency and indicates the highest signal level value. For this reason, if the frequency range of a resonance sweep signal is set to a range of 115 Hz to 130 Hz as shown in FIG. 6(a), the amplitude value gradually increases as the frequency of the sinusoidal wave increases. Thus, the driver can be caused to repeatedly feel monotonously increasing vibration. On the other hand, by setting the lower-limit frequency of a resonance sweep signal to 130 Hz and setting the upper-limit frequency thereof to 143 Hz, the driver can be caused to repeatedly feel monotonously decreasing vibration.

Also, the frequency of the sinusoidal wave can be changed (swept) from a high frequency to a low frequency. By changing (sweeping) the frequency from a high frequency to a low frequency, the frequency can be reduced while monotonously increasing the amplitude value, or the frequency can be reduced while monotonously reducing the amplitude value.

As seen above, by setting the range in which the frequency of a resonance sweep signal is swept, to a range equal to or lower than the resonant frequency or a range equal to or higher than the resonant frequency, changes can be made to the vibration. Or, by sweeping the frequency of a resonance sweep signal in a direction from a high frequency to a low frequency or in a direction from a low frequency to a high frequency, changes can be made to the vibration. Accordingly, by using the changes in the vibration, the vibration can be changed in accordance with the content of an alarm signal, for example, when an obstacle is approaching the vehicle or when the obstacle is departing from the vehicle.

As described above, the vehicle alarm device 1 according to the present embodiment obtains the resonant frequency of the exciter 6 using a detection sweep signal, detects the lower-limit frequency and upper-limit frequency of a frequency band having signal levels equal to or higher than the predetermined threshold, generates a resonance sweep signal in the frequency band determined on the basis of the lower-limit frequency and upper-limit frequency, and outputs the resonance sweep signal to the exciter 6. The exciter 6 can generate resonant vibration by outputting the resonance sweep signal in the form of vibration. As seen above, the exciter 6 uses the resonant frequency in generating vibration. Thus, it is possible to generate relatively large vibration even if the resonance sweep signal has low signal levels and to cause the driver to feel the large vibration. It is also possible to reduce the output and power consumption of the amplifier 5 for outputting the resonance sweep signal (power amplifier, etc.).

The exciter 6 uses a resonance sweep signal to output vibration. Thus, even if the resonant frequency is changed due, for example, to the individual differences between exciters or speakers that generate vibration, variations in seat materials that transmit vibration, the installation position of the exciter or the like in the seat, or the aged deterioration of the seat, exciter, or the like, the frequency band to be swept can be determined such that the changed resonant frequency is crossed (passed through). As a result, the driver can be caused to reliably feel resonant vibration.

Further, the cycle or intensity of vibration can be changed by changing the sweep time or the frequency band to be swept. Thus, the driver can be caused to feel different types of vibration in accordance with the degrees of urgency of alarm signals outputted by the alarm signal output unit 10, or the like.

While the notification device and notification method according to the present invention have been described in detail using the vehicle alarm device 1 as an example, the notification device and notification method according to the present invention are not limited to the example described in the embodiment. Those skilled in the art would apparently conceive of various changes or modifications thereto without departing from the scope of claims, and such changes or modifications can also produce effects similar to those of the vehicle alarm device 1 described in the embodiment.

REFERENCE SIGNS LIST

1 vehicle alarm device 1 (notification device)
3 output signal controller
4 sweep signal generator
5 amplifier
6 exciter (speaker)
7 microphone (vibration detector)
8 sound measurement unit
9 storage unit
10 alarm signal output unit
100 resonant frequency detection system
200 notification signal output system

The invention claimed is:

1. A notification device comprising:
a speaker installed in a seat;
a sweep signal generator configured to generate a detection sweep signal that continuously changes a frequency of vibration that the speaker outputs for a user, by changing a frequency of a predetermined wave at a constant speed in a frequency band in which the user can be notified by the vibration;
a vibration detector configured to detect vibration of a seat surface caused by acoustic sound output by the speaker using the detection sweep signal generated by the sweep signal generator; and
a sound measurement unit configured to determine a frequency band indicating a signal level equal to or higher than a predetermined threshold as a sweep frequency band in frequency characteristics of the vibration detected by the vibration detector, wherein
the sweep signal generator sets a variation margin for the sweep frequency band determined by the sound measurement unit, the sweep signal generator generates a resonance sweep signal by changing the frequency of the predetermined wave at a constant speed in the sweep frequency band and in the variation margin,
the speaker generates vibration in the seat using the resonance sweep signal, and
the sweep signal generator changes a state of vibration generated by the speaker by setting at least one of an upper-limit frequency and a lower-limit frequency of the resonance sweep signal obtained by changing the frequency of the predetermined wave, to a frequency different from an upper-limit frequency and a lower-limit frequency of the sweep frequency band determined by the sound measurement unit by adding the variation margin to at least one of the upper-limit frequency and the lower-limit frequency of the sweep frequency band determined by the sound measurement unit.

2. The notification device according to claim 1,
wherein the sweep signal generator changes a cycle of vibration generated by the speaker by changing a speed at which the frequency of the predetermined wave of the resonance sweep signal is changed.

3. The notification device according to claim 1,
wherein the sound measurement unit determines, as a resonant frequency, a frequency value indicating a high signal level in the frequency characteristics of the vibration detected by the vibration detector, and
the sweep signal generator changes, to the resonant frequency, at least one of the upper-limit frequency and the lower-limit frequency of the resonance sweep signal obtained by changing the frequency of the predetermined wave.

4. A notification method using a notification device comprising:
a detection sweep signal generation step of generating, by a sweep signal generator, a detection sweep signal that continuously changes a frequency of vibration that a speaker installed in a seat outputs for a user, by changing a frequency of a predetermined wave at a constant speed in a frequency band in which the user can be notified by the vibration;
a vibration detection step of detecting, by a vibration detector, vibration of a seat surface caused by acoustic sound output by the speaker using the detection sweep signal generated in the detection sweep signal generation step;
a sound measurement step of determining, by a sound measurement unit, a frequency band indicating a signal level equal to or higher than a predetermined threshold as a sweep frequency band in frequency characteristics of the vibration detected in the vibration detection step; and
a resonance sweep signal generation step of generating, by the sweep signal generator, a resonance sweep signal by setting a variation margin for the sweep frequency band determined by the sound measurement unit and changing the frequency of the predetermined wave at a constant speed in the sweep frequency band and in the variation margin, wherein
the speaker generates vibration in the seat using the resonance sweep signal, and
the resonance sweep signal generation step comprises the sweep signal generator changing a state of vibration generated by the speaker by setting at least one of an upper-limit frequency and a lower-limit frequency of the resonance sweep signal obtained by changing the frequency of the predetermined wave, to a frequency different from an upper-limit frequency and a lower-limit frequency of the sweep frequency band determined in the sound measurement step by adding the variation margin to at least one of the upper-limit frequency and the lower-limit frequency of the sweep frequency band determined by the sound measurement step.

5. The notification method using the notification device according to claim 4,
wherein the resonance sweep signal generation step comprises the sweep signal generator changing a cycle of vibration generated by the speaker by changing a speed at which the frequency of the predetermined wave of the resonance sweep signal is changed.

6. The notification method using the notification device according to claim 4, wherein
the sound measurement step comprises the sound measurement unit determining, as a resonant frequency, a frequency value indicating a high signal level in the frequency characteristics of the vibration detected in the vibration detection step, and the resonance sweep signal generation step comprises the sweep signal generator changing, to the resonant frequency, at least one of the upper-limit frequency and the lower-limit frequency of the resonance sweep signal obtained by changing the frequency of the predetermined wave.

\* \* \* \* \*